UNITED STATES PATENT OFFICE.

NICOLAS WALCH, OF NEWTON HIGHLANDS, MASSACHUSETTS, ASSIGNOR TO ERWA CHEMICAL MANUFACTURING COMPANY, OF NEEDHAM, MASSACHUSETTS, A CORPORATION OF MASSACHUSETTS.

RUBBER COMPOSITION AND METHOD OF MAKING THE SAME.

1,392,240.  Specification of Letters Patent.  Patented Sept. 27, 1921.

No Drawing.   Application filed March 30, 1918. Serial No. 225,656.

*To all whom it may concern:*

Be it known that I, NICOLAS WALCH, a subject of the Grand Duchy of Luxemburg, and resident of Newton Highlands, in the county of Middlesex and State of Massachusetts, have invented new and useful Improvements in Rubber Compositions and Methods of Making Same, of which the following is a specification.

This invention relates to a rubbery composition and method of making same and more particularly to a cementitious composition for patching punctures and for filling holes and cracks in rubber tires and the like.

The principal objects of the invention are to provide a composition which may be applied to rubber tires and the like in liquid or semi-liquid form to make a patch and which will dry quickly, the composition preferably being applied in a relatively thick layer so as to constitute the patch itself when dry, although it may if desired be used as ordinary cement to secure a patch to the tire; to provide a composition which has great adhesive power when applied either to rubber or other material, such as canvas for example, and which may be firmly secured to such materials without employing any of the ordinary vulcanizing processes and without employing heat; and to provide a composition for filling cracks and crevices in automobile tires and the like which adheres firmly to both the rubber and canvas portions of the tires without heating or vulcanizing and which possesses wearing qualities comparable with automobile tires.

My improved composition essentially comprises rubber and celluloid ingredients combined with a suitable solvent to form a liquid or semi-liquid or paste, the consistency or degree of fluidity being variable by varying the amount of solvent depending upon the use for which the composition is to be employed. Fairly satisfactory results may be obtained by employing any one or more of several rubber ingredients, such as various natural and synthetic forms of caoutchouc, but the best results are afforded by india-rubber or Pará-rubber, preferably in the washed form. The celluloid ingredient or ingredients may comprise either pure celluloid or certain of the celluloid substitutes but I preferably employ either substantially pure celluloid as such or the various ingredients which yield celluloid such as nitro-cellulose or collodion gun-cotton and camphor. Suitable solvents comprise benzol (*i. e.*, pure benzol, gasolene or naphtha), ether, acetone, acetone oil, etc., as will hereinafter be more fully explained.

In its more elemental form my improved composition is preferably comprised as follows: 1 lb. rubber, 1 lb. celluloid, 1 gal. benzol, ⅝ gal. ether, and ¼ gal. acetone oil. These ingredients are mixed together in the form of a colloidal solution, both the rubber and the celluloid being held in colloidal suspension. I may also add ⅛ gal. carbon tetrachlorid to render the composition non-inflammable. While the above solvents may be varied both in kind and quantity the limit for the solubility of the celluloid must not be exceeded and I preferably provide the several different solvents for the following reasons.

Ether and acetone dissolve grease and oils to such extent that the presence of a certain amount of greasy material on a surface to which the composition is applied will not prevent the composition from firmly adhering to the surface. A certain proportion of acetone oil is desirable in the celluloid solvent for the reason that it is a good solvent of celluloid and rubber and is less volatile than ether and less inflammable. Benzol is a good solvent for rubber. A better mixture of the rubber and celluloid solutions is obtained by using some benzol in the celluloid solution and by using some ether in the rubber solution. Gasolene or naphtha may be employed as a substitute for a part or all of the benzol but these solvents are inferior for most purposes for the reason that they are more oily than benzol.

The solution above described is preferably made by forming separate solutions of the rubber and the celluloid and mixing the two solutions. For example: 1 lb. of rubber is dissolved in a mixture of ¾ gal. benzol, ⅛ gal. ether and ⅛ gal. of carbon tetrachlorid; 1 lb. of celluloid is dissolved in a mixture of ¼ gal. benzol, ½ gal. ether or acetone and ¼ gal. acetone oil; and the two solutions thus formed are thoroughly mixed together in any suitable manner. In this way a homogeneous solution of the colloidal ingredients, rubber and celluloid, may be effected. This solution is useful by itself as a cement and it may be employed as a binder in the compounds now to be described.

To the above mixture of rubber and celluloid ingredients may be added certain proportions of inorganic fillers as zinc oxid, lithopone, silica and sulfur, or organic fillers, as for example, rubber buffings. These ingredients are first well ground and then thoroughly incorporated with the cement. For example, to 1 gal. of a solution of rubber and celluloid of the proportions above described I propose to add 2.2 lbs. of rubber buffings or the like and ¼ lb. of ground amorphous silica. This compound will adhere to either the rubber or canvas portions of a tire and wear substantially as long as the original portions of the tire.

Instead of forming the rubber and celluloid solutions separately, as above described, the cementitious solution comprising rubber and celluloid may under certain circumstances be formed by dissolving the rubber and celluloid together in a single solution. This method may be employed, for example, when the proportion of solvents considerably exceeds the amount required to dissolve the rubber and celluloid.

Herein I have employed the term rubber and celluloid ingredients to connote ingredients comprising either rubber and celluloid or their equivalents or their respective essential constituents.

I claim:

1. A composition composed essentially of rubber and celluloid.

2. A composition composed essentially of caoutchouc and celluloid ingredients.

3. A cementitious composition consisting of a thick paste composed essentially of rubber and celluloid.

4. A composition comprising rubber and celluloid ingredients and a solvent comprising benzol.

5. A composition comprising rubber and celluloid ingredients and a solvent comprising benzol and acetone.

6. A composition comprising rubber and celluloid ingredients, and a solvent comprising benzol and acetone oil.

7. A composition comprising rubber and celluloid ingredients, and a solvent comprising benzol, acetone and acetone oil.

8. A composition comprising rubber and celluloid ingredients, ether, benzol and acetone oil.

9. A composition comprising rubber and celluloid ingredients, ether, benzol, acetone oil and carbon tetrachlorid.

10. A composition comprising rubber associated with sulfur and celluloid ingredients, and zinc oxid.

11. A composition comprising rubber associated with sulfur and celluloid ingredients, zinc oxid, and solid rubbery particles.

12. The method of making rubbery composition comprising separately dissolving rubber and celluloid ingredients in solvents, and adding a filler ingredient comprising solid particles of rubbery material.

13. The method of making rubbery composition comprising separately dissolving rubber and celluloid ingredients in solvents, and adding a filler ingredient comprising solid particles of rubber to form a paste.

14. A composition comprising rubber and celluloid ingredients, an inorganic filler and a comminuted organic filler.

Signed by me at Wilton, New Hampshire, this 27th day of March, 1918.

NICOLAS WALCH.